Jan. 4, 1927.

A. H. BATES 1,612,901

FREIGHT HANDLING APPARATUS

Filed August 3, 1925   2 Sheets-Sheet 1

Inventor
Albert H. Bates

Jan. 4, 1927.

A. H. BATES 1,612,901

FREIGHT HANDLING APPARATUS

Filed August 3, 1925    2 Sheets-Sheet 2

Patented Jan. 4, 1927.

1,612,901

UNITED STATES PATENT OFFICE.

ALBERT H. BATES, OF SHAKER HEIGHTS, OHIO, ASSIGNOR TO MOTOR TERMINALS COMPANY, OF WILMINGTON, DELAWARE, A CORPORATION OF DELAWARE.

FREIGHT-HANDLING APPARATUS.

Application filed August 3, 1925. Serial No. 47,743.

This invention relates to freight handling apparatus and is particularly useful in connection with hoisting and unloading machinery adapted to raise and transport removable automobile bodies or containers for freight. Such trolley hoists have been built to swing the container to various angles in order to place the container properly on the truck, even though the truck is not exactly aligned with the hoist. This turning or weaving feature considerably increases the cost of the hoists and in many cases such hoists are impracticable.

The difficulty of aligning the truck with a container suspended by the hoist frequently arises by reason of the permanent construction of road beds adjacent the platforms provided by the user, or used of necessity by the management of the system as sub-stations. Such road bed construction prohibits the employment of individual truck slips for enabling the drivers to position their trucks accurately beneath the load-engaging element of the hoist or crane. Another difficulty in the way of providing weaving mechanism in connection with the hoists, arises because of lack of headroom; for the buildings owned by users of the system, and the buildings used as sub-stations, may not be designed to support, or have adequate room for hoists capable of turning or weaving.

I propose to provide the individual automobile trucks with a weaving device such that the truck need be only approximately located beneath the hoisting mechanism, and the supporting platform of the truck may be swung to proper position beneath the container suspended by the hoist.

The general object of the invention therefore, is to provide a truck with a convenient, economical and easily operated weaving mechanism, for the purpose mentioned.

A further object is to provide a weaving device for the truck platform which may be operated from different points relative to the truck frame. Another object is to provide a weaving apparatus in which power may be applied at a given point relative to the truck frame and distributed evenly to widely separated points to facilitate the turning or weaving operation.

Further objects and features of my invention will become apparent in the further description which relates to the accompanying drawings wherein I have illustrated the preferred form. The essential characteristics will be summarized in the claims.

Figure 1:
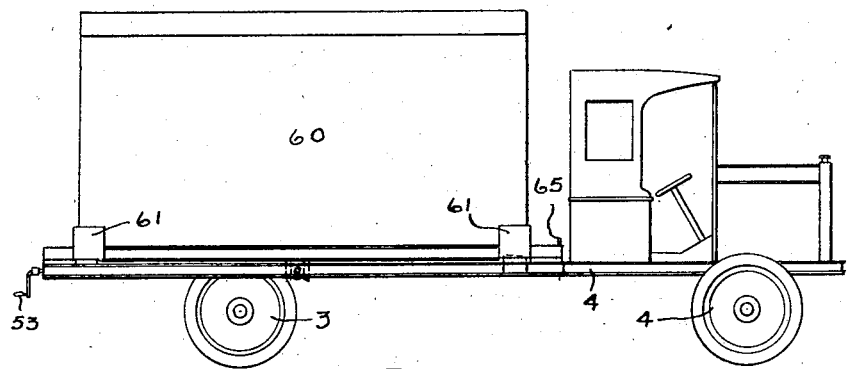
Figure 2:
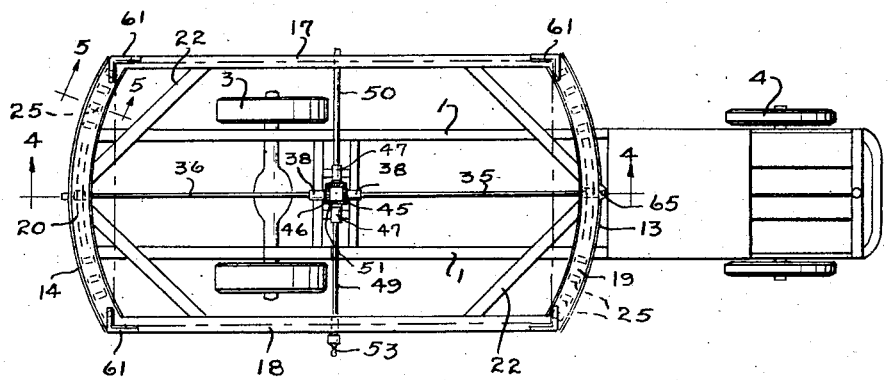
Figure 4:
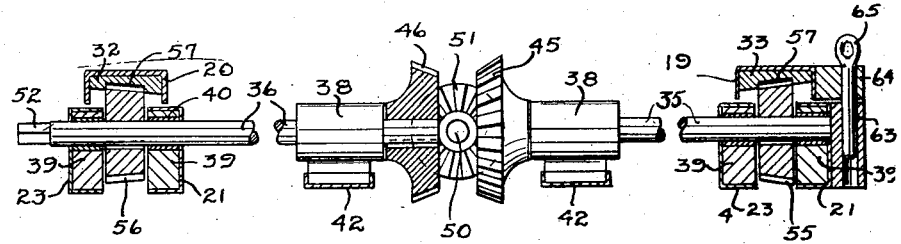
Figure 5:
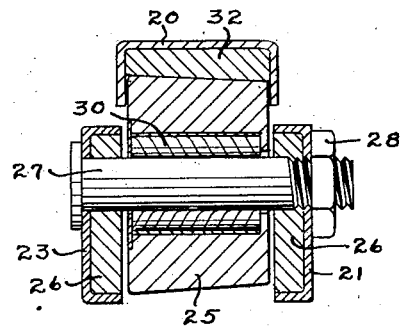
Figure 3:
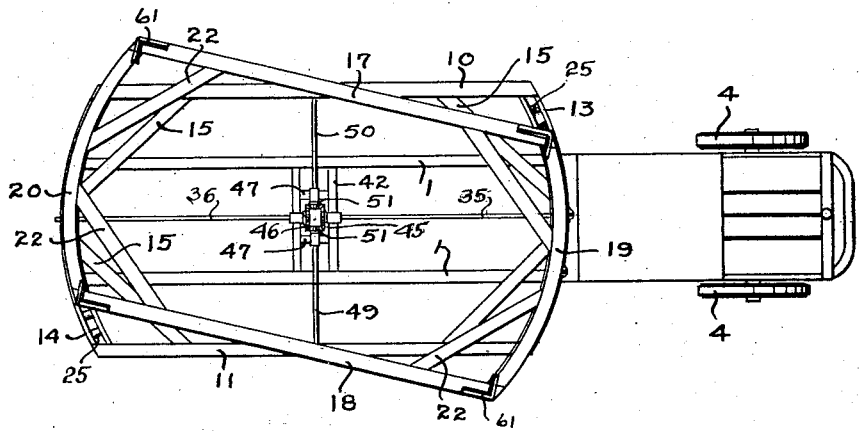

In the drawings, Fig. 1 is a side elevation of the truck with my weaving apparatus mounted thereon and shown as supporting a container; Fig. 2 is a plan of my weaving apparatus mounted on the truck; Fig. 3 is a similar plan showing the supporting platform swung at an angle to the main truck frame; Fig. 4 is a fragmentary longitudinal section taken along the lines 4—4 of Fig. 2; Fig. 5 is a detail in cross section on the line 5—5 of Fig. 2.

Referring in detail to the drawings and indicating the various parts by suitable characters, 1 indicates the truck frame, mounted on the usual traction and dirigible wheels 3 and 4 respectively. The base support for the table may be embodied with the truck frame, but I have shown a separate base support as comprising side frame members 10 and 11 and cross frame members 13 and 14; the latter two being preferably arcuate and overlying the longitudinal frame members of the truck. Adequate diagonal bracing members may extend from the side members 10 and 11 to the arcuate end members as shown at 15.

Substantially superposing the base frame, I provide a table framework which may consist of side frame members 17 and 18 and arcuate end frame members designated 19 and 20 suitably braced by diagonals 22. The end frame members 13 and 14 of the base may each comprise pairs of channels 21 and 23, each pair, as shown in Fig. 5, being adapted to support rollers such as indicated at 25. The channels may be reinforced by suitable inserts as shown at 26 for providing adequate bearing for a pin or bolt 27 extending therethrough and supporting the roller. The bolt may be held in place by a suitable nut 28.

I preferably provide roller bearings within the rollers 25 such as shown at 30, Fig. 5, which rest directly on the bolt 27, to minimize friction. I have shown the rollers conically formed having their theoretical apices at the center of rotation of the frame. The platform frame members 19 and 20 are preferably channels, having their flanges extending downwardly over the ends of the rollers, and a suitable trackway for the rollers is provided within these channels such as the beveled inserts 32 and 33, Figs. 4 and 5. Any suitable number of rollers 25 may be provided on either side of the center line of the truck. I have shown in Fig. 2, four of such rollers mounted near each end of the arcuate frame members 13 and 14.

Suitable means for swinging or weaving the table is provided. I preferably employ a system of bevel gearing located at the center of rotation of the platform connected by suitable shafts with pinions engaging racks on the table frame. Such system of gearing may comprise a forwardly extending shaft 35 and a rearwardly extending shaft 36 mounted in suitable bearing brackets 38 at their inner ends and each having bearing supports 39 in their respective arcuate frame members 13 and 14. These latter bearings may consist of inserts secured in the channels 21 and 23 and provided with bearing bushings 40. The bearing brackets 38 may be supported on cross frame members 42 carried by the frame 1 of the truck. Between the bearings 38, I provide bevel gears 45 and 46 rigid on their respective shafts 35 and 36. The outer ends of each shaft 35 and 36 rigidly carry beveled pinions 55 and 56 respectively positioned between the channels comprising the arcuate frame members 13 and 14. These beveled pinions 55 and 56 engage rack teeth 57 preferably formed in the under faces of the trackway members 33 and 32.

Since either side or the rear of the track may be so placed relative to a platform or another truck that it would be inconvenient to operate the gearing from that point, I have provided an operating means accessible from various positions. As shown such means includes operating shafts designated 49 and 50. Each of these shafts is provided with a bevel gear such as shown at 51, in mesh with both the gears 45 and 46 and these shafts as well as the rearward end of the shaft 36 may be formed to receive a removable crank designated 53. When any one of the shafts 36, 49 or 50 is turned, as by means of such a crank, the gearing being permanently connected together, swings the table in one direction or the other, the pinion 56 turning in one direction and the pinion 55 turning in the opposite direction.

It will be seen that if a container is suspended above the table frame disposed at an angle to the truck but substantially above it, the table frame may be swung to accurately register beneath the container for holding a removable boxlike container such as shown at 60, Fig. 1, in place when lowered onto the table. Suitable brackets 61 may be mounted on the frame members which form the table, and the container may rest along the side frame members 17 and 18 as a support.

Any suitable means may be employed for locking the upper and lower frame members together after the container is resting on the table and the table is returned to its normal position. Such means may consist of ears 63 and 64 on the base and table frame members 13 and 19 respectively. These ears are shown as having openings for receiving a suitable pin 65 insertable through the upper ear and extending into the ear 63.

From the above description, it will be seen that if the truck bearing a container is driven to an approximate position beneath the hoist, it will be much simpler for the operator to get out and apply the handle to one of the shafts and turn the table to place the container directly beneath the engaging hooks of the hoisting mechanism, than to drive the truck forward and back until it is accurately parallel to the hoist or hook frame even granting that there is adequate room for so doing. Similarly in receiving the loaded body it is not necessary for the driver to accurately position his truck frame beneath it.

Having thus described my invention, I claim:—

1. In combination, a motor truck, a frame therefor, a table supported on the frame, four upwardly projecting L-shaped guide members carried by the table and located at the four corners of a rectangle and adapted to receive and hold a container in position, and means for turning the table on the truck frame.

2. In combination with an automobile truck, a frame therefor, transverse arcuate frame members at the front and rear end of the frame, a table superposed above said frame having similar arcuate frame members, and anti-friction rollers bearing between the respective sets of arcuate members.

3. In combination with an automobile truck, a frame therefor, transverse arcuate supporting members carried by the frame, longitudinally extending members connecting the arcuate members, a table superposed over the arcuate members and longitudinally extending members, and anti-friction means bearing between said table and members whereby the table may be turned relative to the truck frame and thus be accurately located beneath a container supported on a hoist.

4. In combination with an automobile truck, a frame, arcuate members carried by the frame, a table having arcuate members superposed above said first named arcuate members and having guide members adapted to receive a container lowered by a trolley hoist, means including a system of bevel gearing having shafts associated therewith extending to said arcuate members, and a rack and pinion connection between said shafts and arcuate members whereby said table may be turned, and means for operating said bevel gearing.

5. In combination with an auto truck, a frame therefor, arcuate frame members supported at either end of said frame, a table having arcuate members superposed above said first named arcuate members, a pair of shafts extending from the central position into engagement with said arcuate frame members, pinions mounted on said shafts, racks carried by said arcuate table members in mesh with the pinions, manual means whereby the shafts may be turned simultaneously one in one direction and one in the other from a position at one side of the truck.

6. In combination with a truck frame, a turn table mounted thereon, gearing for operating the table, guide members mounted upon the table adapted to receive a container lowered from a hoist and positioned to prevent it from shifting in any horizontal direction, and means for manually operating the gearing to weave the table in either direction from a central position relative to the truck frame to align the brackets with the container.

7. In combination with a truck frame, a turn table mounted theeron, brackets supported by the turn table adapted to receive a container and hold it in position on the table, means for manually operating the table including a system of bevel gearing operable from separated points along the truck frame.

8. In combination a truck frame, arcuate frame members located at either end thereof in pairs, rollers mounted between each pair of arcuate members, arcuate members for engaging the rollers having guiding portions extending downwardly over the ends of the rollers, means for connecting said last named arcuate members to form a table for a container being lowered to the table by a hoist, and means for swinging the table on the rollers.

9. In combination with an auto truck, a frame therefor, arcuate frame members supported at either end of said frame, a table having arcuate members superposed above said first named arcuate members, rollers between the arcuate members of the frame and table, an arcuate rack located in an intermediate zone of one of said arcuate members so as not to interfere with the tracking of the rollers, a pinion meshing with said rack and means for rotating said pinion.

In testimony whereof, I hereunto affix my signature.

ALBERT H. BATES.